Patented Oct. 21, 1952

2,615,018

UNITED STATES PATENT OFFICE 2,615,018

PREPARATION OF MELAMINE

Leslie C. Lane, Bethel, Conn., assignor to American Cyanamid Company, New York, N. Y., a corporation of Maine No Drawing. Application October 25, 1950,
Serial No. 192,149

4 Claims. (Cl. 260—249.7)

The present invention relates to the preparation of melamine.

It is an object of the invention to prepare melamine from hydrogen cyanide in the presence of a catalyst such as fuller's earth or the like. A further object is to prepare melamine from hydrogen cyanide under heat and pressure. Additional objects will be apparent from the discussion hereinafter.

The invention contemplates heating hydrogen cyanide in a closed reaction zone in the presence of a melamine-forming catalyst. The temperature can range from about 275° C. to about 550° C., and the pressure can be about 500 p. s. i. and up. When conducting the process in a sealed autoclave the pressure is ordinarily 1000–5000 p. s. i., but can be higher. The catalyst can be any inert substance that provides a high surface area. Among such materials are kieselguhr, celite, kaolin, pumice, alumina, and the like. Fuller's earth is preferred. The time of heating is not critical, but should be at least 15 minutes at reaction temperature.

The following examples illustrate without limiting the invention.

Example 1

Into a 310-cc. autoclave containing 20 g. of kieselguhr 20 g. of HCN was pumped. The autoclave was sealed and heated at 350° C. under the autogenously developed pressure of 600 p. s. i. for 6 hours. The autoclave was then cooled to room temperature, vented, and the solids washed out with 500 cc. of hot water. The slurry was heated nearly to boiling, then filtered to remove HCN polymer. The filtrate was reduced in volume on a steam bath and cooled to precipitate a small amount of melamine crystals.

In a preferred embodiment ammonia is added to the autoclave charge to increase the yield of melamine. For this purpose, the HCN:ammonia mole ratio charged can vary between wide limits, e. g., 1:1–100, although about 1:10 is preferred.

Example 2

Using the same procedure as in Example 1, a solution of 18 g. of HCN in 47 g. of liquid $NH_3$ was pumped into an autoclave containing 80 g. of fuller's earth. The autoclave was maintained at a temperature of 350° C. while the charge was being pumped in, and 45 minutes were required to complete the charging. The autoclave was then sealed and maintained at 350° C. for an additional 1¼ hours, then quenched, vented, and opened. Melamine was recovered by extracting the reaction mass with boiling water. Yield, 0.7 g.

It is essential that the catalyst be thoroughly dried. The catalysts used herein were dried in a muffle furnace at 450° C. for 5 hours.

Into a 310-cc. autoclave with a single inlet in its head (the "reactor autoclave") was put 157 g. of fuller's earth previously dried at 450° C. for 5 hours. The air was flushed out of the autoclave with ammonia, and the autoclave was then heated to 400° C.

Into another 310-cc. autoclave with two inlets in its head, one carrying a dip-leg, was placed 42 g. of liquid $NH_3$ and 8 g. of HCN, making a solution of $NH_4CN$ in liquid $NH_3$. Nitrogen was then pumped into this autoclave to a pressure of 9300 p. s. i.

The feed autoclave was then connected in an inverted position to the reactor autoclave, and the $NH_3$–$NH_4$–CN solution was fed very slowly into the reactor autoclave (still at 400° C.) until the pressures in the two autoclaves were equal (25 minutes required). The reactor was kept at 400° C. for an additional 35 minutes, then it was allowed to cool somewhat and finally it was quenched to room temperature.

The $NH_3$ and $N_2$ were vented, and the autoclave opened and washed out. The product was extracted from the catalyst with five 150-ml. portions of boiling water. The extract was neutralized with 10 ml. of concentrated HCl, treated with charcoal to aid in clarification and filtered. The filtrate contained 0.47 g. of melamine (analysis by precipitation of the insoluble cyanurate from an aliquot). The melamine can be recovered by reducing the volume of the solution, then cooling to crystallize out the melamine.

Other conditions being equal, the yield of melamine has been found to vary with temperature. For example the yield at 350° C. is about 6%, at 400° C. about 9%, and at 500° C. about 7%.

In one embodiment of the invention, polymerization of the HCN is inhibited by first introducing ammonia into the catalyst-containing reactor, bringing the ammonia up to reaction temperature, and then adding the HCN to the hot ammonia. If desired, the ammonia can be preheated before pumping it into the reactor. In such instance the HCN:$NH_3$ mole ratio is preferably but not necessarily about 1:10.

While the invention has been described with particular reference to specific embodiments, it is to be understood that it is not to be limited thereto but is to be construed broadly and restricted solely by the scope of the appended claims.

I claim:

1. The method of making melamine that comprises heating hydrogen cyanide in the presence of anhydrous fuller's earth at a temperature in the range of 275–550° C. in a closed reaction zone under a pressure of at least 500 p. s. i.

2. The method of making melamine that comprises heating hydrogen cyanide in the presence of an anhydrous catalyst of the group consisting of kieselguhr, celite, kaolin, pumice, alumina, and fuller's earth at a temperature in the range 275–550° C. in a closed reaction zone under a pressure of at least 500 p. s. i.

3. The method of making melamine that comprises heating hydrogen cyanide and ammonia in the presence of anhydrous fuller's earth in a closed reaction zone under the autogenously developed pressure at a temperature of 275°–550° C., and recovering the thus-formed melamine.

4. The method of making melamine that comprises heating hydrogen cyanide and ammonia in the approximate mole ratio of 1:10 in the presence of anhydrous fuller's earth in a closed reaction zone at a temperature of about 400° C. and under a pressure of at least 500 p. s. i. and separating the thus-formed melamine from the resultant reaction mass.

LESLIE C. LANE.

No references cited.